United States Patent [19]

Williams

[11] 3,748,561
[45] July 24, 1973

[54] REMOTE STARTING CONTROL CIRCUIT FOR WELDER POWER SUPPLY

[75] Inventor: Burton M. Williams, Eugene, Oreg.

[73] Assignee: Fibreboard Corporation, San Francisco, Calif.

[22] Filed: Oct. 6, 1971

[21] Appl. No.: 186,853

[52] U.S. Cl. .................................. 318/484, 322/11
[51] Int. Cl. ................................................ H02r 1/04
[58] Field of Search .... 318/445–447, 466, 478, 484; 290/30, 40; 219/126; 307/141, 141.4; 322/11, 13

[56] References Cited
UNITED STATES PATENTS

| 2,427,127 | 9/1947 | Dysart | 322/11 |
| 2,419,276 | 4/1947 | Miller et al. | 322/11 |
| 2,412,745 | 12/1946 | Packard et al. | 322/11 X |

Primary Examiner—Bernard A. Gilheany
Assistant Examiner—W. E. Duncanson, Jr.
Attorney—Kolisch, Hartwell & Dickinson

[57] ABSTRACT

A control circuit for remote starting of an AC motor coupled to a DC generator used to supply a welding load circuit. A low voltage switching circuit connected across the load circuit starts the motor upon contact between the welding rod and workpiece and is then reset. The low voltage switching circuit automatically sets a timer which maintains the motor on for a predetermined time. Another circuit sensitive to DC current in the load circuit and resets the timer each time a welding arc is struck. If the timer times out and cuts off the motor before an arc is struck the motor can be restarted by contact between the rod and workpiece. Manual starting means is provided which also sets the timer.

7 Claims, 1 Drawing Figure

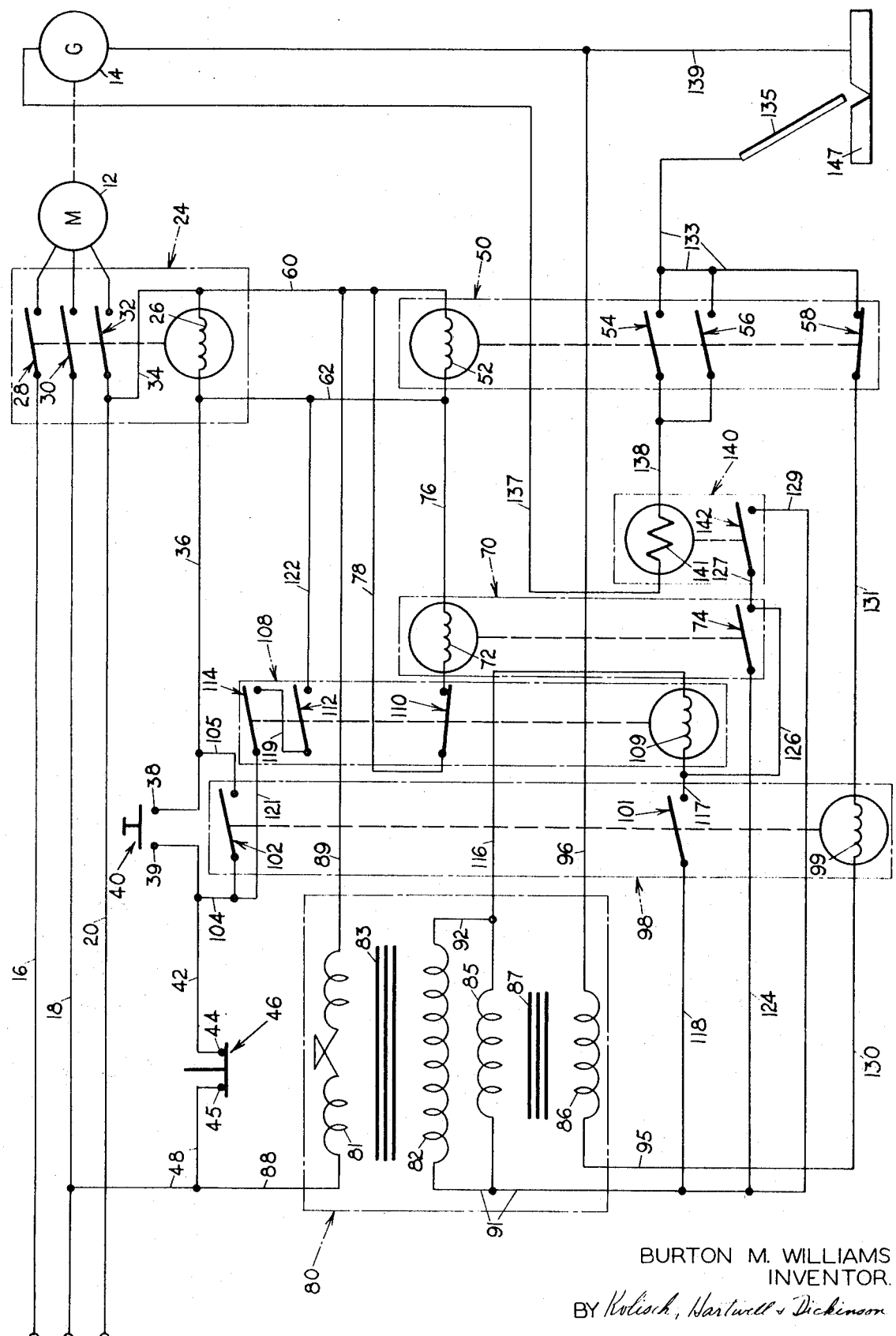

REMOTE STARTING CONTROL CIRCUIT FOR WELDER POWER SUPPLY

BACKGROUND OF THE INVENTION

The present invention relates to a control circuit for remote starting of an AC motor. More particularly, the invention concerns such a control circuit for an AC motor coupled to a DC generator used to supply current to a welding load circuit including a workpiece and a rod adapted for manual movement into contact with the workpiece.

Conventional arc welding operations require the use of DC current which is often supplied by a mechanically coupled AC motor—DC generator set that is used to convert single-phase AC power to direct current. Such equipment is relatively large and is not easily portable. Consequently, when welding jobs are to be performed at many different locations, such as occurs in the welding of steel in high-rise buildings, for example, problems arise in the manual control of the motor-generator by the welder. Thus, either the motor generator must be turned on and left on during an entire work shift, or the welder must return to the location of the motor-generator each time he wishes to start or stop the motor-generator set.

SUMMARY OF THE INVENTION

Accordingly, it is an object of the invention to provide a control circuit for remote starting and control of an AC motor.

It is another object of the invention to provide a control circuit for remote starting and control of an AC motor coupled to a DC generator, used for supplying a welding load circuit, which control circuit is responsive to contact between the welding rod and workpiece.

It is yet another object of the invention to provide, in such a remote starting control circuit, means for resetting the control circuit each time the motor is started.

It is a further object of the invention to provide, in such a remote starting control circuit, timer means for maintaining the motor in an energized state for a predetermined time.

It is yet a further object of the invention to provide, in such a remote starting control circuit, means responsive to the presence of DC current in the load circuit for resetting the timer each time a welding arc is struck.

BRIEF DESCRIPTION OF THE DRAWINGS

Other features and advantages of the invention will become apparent from the following detailed description, taken in conjunction with the accompanying drawing wherein a schematic diagram of a remote starting control circuit designed in accordance with the invention is illustrated.

DETAILED DESCRIPTION OF THE INVENTION

Referring now to the upper portion of the drawing a single-phase AC motor 12 is illustrated mechanically coupled to a DC generator 14. Also a three line single-phase 220/440 volt AC power supply is illustrated comprising lines 16, 18, 20 adapted to be energized by suitable means not illustrated. A starting relay 24 is provided for selectively connecting the power lines to input terminals of motor 12. More particularly, relay 24 is a conventional AC relay including a starting coil 26 and power circuit switch means in the form of three movable, single-pole switches 28, 30, 32. One terminal of each switch is connected to one of lines 16, 18, 20 and the other terminal of each switch is connected to a corresponding input terminal of motor 12. The switches are normally open when coil 26 is deenergized and close upon AC energization of the coil.

One terminal of coil 26 is connected by a conductor 34 to line 20 and the other terminal of coil 26 is connected by conductor 36 to a terminal 38 of a manual start switch 40. The other terminal 39 of switch 40 is connected by conductor 42 to a terminal 44 of a manual stop switch 46. The other terminal 45 of switch 46 is connected by a conductor 48 to line 18 which is the neutral line.

Illustrated below relay 24 is a conventional AC relay 50 including a coil 52 and three movable, single-pole switches 54, 56, 58. Switches 54 and 56 are normally open when coil 52 is de-energized and switch 58 is normally closed when coil 52 is deenergized. One terminal of coil 52 is connected by a conductor 60 to conductor 34 to receive current from line 20. The other terminal of coil 52 is connected by a conductor 62 to conductor 36, placing coil 52 in electrical parallel with coil 26.

A conventional AC relay 70 is provided including a coil 72 and a movable, single-pole switch 74. Coil 72 is adapted to be connected in parallel with coil 52. Thus, one terminal of coil 72 is connected to conductor 62 by a conductor 76. The other terminal of coil 72 is connected directly to a terminal of a normally closed movable switch 110, and the other terminal of switch 110 is connected by a conductor 78 to conductor 60.

Referring now to the left side of the drawing a power transformer 80 is illustrated including a primary winding 81 magnetically coupled to an intermediate winding 82 by a core 83. Winding 82 is connected in electrical parallel with another intermediate winding 85, and winding 85 is magnetically coupled to a winding 86 by a core 87.

One terminal of winding 81 is connected by a conductor 88 to conductor 48 and line 18, and the other terminal of winding 81 is connected by conductor 89 to conductor 60 to receive current from line 20. Windings 82 and 85 are connected in electrical parallel with the terminals on one side of the windings being connected to a conductor 91 and the terminals on the other side of the windings being connected to a conductor 92. One end of winding 86 is connected to a conductor 95 and the other end of winding 86 is connected to a conductor 96.

In the embodiment illustrated, with suitable load connections provided for windings 82, 85 and 86 as explained hereinafter, an input voltage of 220 volts across primary 81 produces a 110 volt output across winding 82 and a 24 volt output across winding 86.

An AC relay 98 is provided including a coil 99 and movable single-pole switches 101, 102. The contacts of switches 101 and 102 are normally open when coil 99 is deenergized. Switch 102 is connected in electrical parallel with the manual start switch, having a first terminal connected to conductor 42 by a conductor 104 and having another terminal connected to conductor 36 by a conductor 105.

A timer 108 is provided including a timer coil 109 and movable, single-pole switches 110, 112, 114. One terminal of coil 109 is connected by a conductor 116 to conductor 92 and the other terminal of coil 109 is connected by a conductor 117 to one side of switch 101. The other side of switch 101 is connected by a conductor 118 to conductor 91 whereby a circuit can be selectively established through the timer coil from winding 82. Switches 112 and 114 are connected in electrical series by a conductor 119, with one terminal of the series combination being connected by a conductor 121 to conductor 104 and the other terminal of the series combination being connected by a conductor 122 to conductor 62.

Referring again to the bottom of the drawing, one terminal of switch 74 is connected by a conductor 124 to conductor 91 and the other terminal of switch 74 is connected by a conductor 126 to conductor 117. Accordingly, an alternate circuit can be established through timer coil 109 from winding 82, through switch 74.

A conductor 127 connects conductor 126 to a first terminal of a movable switch 142 and a conductor 129 connects the other terminal of switch 142 to conductor 91. A conductor 130 is connected between conductor 95 and one terminal of coil 99, and the other terminal of the coil is connected by a conductor 131 to a terminal of movable switch 58. The other terminal of switch 58 is connected by a conductor 133 to welding rod 135. Conductor 133 is also connected to one terminal of parallel connected switches 54, 56. The other terminal of switches 54, 56 is connected by conductor 138 to one terminal of a winding 141 of a DC solenoid relay 140. The other terminal of winding 141 is connected by a conductor 137 to one output terminal of generator 14. The other output terminal of the generator is connected by a conductor 139 to workpiece 147. Conductor 139, the workpiece, rod 135, conductor 138, winding or coil 141, and conductor 137 form a welding load circuit in the apparatus. A low voltage switching circuit connected across the welding load circuit comprises the 24 volt winding 86 conductor 96, conductor 139, rod 135, switch 58, conductor 131, coil 99, and conductor 150.

The operation of the circuit will now be described, with the assumption that the movable switches each occupy the position illustrated in the drawing and the coils are deenergized. Accordingly, an operator wishing to start motor 12 and generator 14 touches rod 135 to workpiece 147. This establishes low voltage AC current flow from winding 86 through the workpiece and through rod 135, on through normally closed switch 58 and coil 99. Upon energization of coil 99 movable switches 101 and 102 are both moved to closed positions.

Upon closure of switch 102 a power circuit is completed from line 18 through stop button 46, switch 102 and starting coil 26 to line 20. Consequently, switches 28, 30, and 32 are closed whereby AC current is provided to motor 12 and it is started.

Closure of switch 101 results in completion of a power circuit from winding 82 through switch 101 and timer coil 109. Upon energization of coil 109 switch 110 opens and switches 112, 114 close. Also upon energization of coil 109 a timer mechanism of timer 108 is reset to operate for a predetermined interval. Thereafter, upon deenergization of coil 109 the timer mechanism will operate through the predetermined interval, after which contacts 110, 112, 114 will return their normally deenergized positions.

After the timer mechanism is reset and as the start coil 26 is energized, coil 52 is also energized whereby switches 54, 56 are closed and switch 58 is opened. The closure of switches 54, 56 connects the DC generator to the load circuit through coil 141. Opening of switch 58 disconnects relay coil 99 from winding 86, deenergizing it. As previously mentioned, deenergization of coil 99 results in opening of switch 101 whereby the timer mechanism begins operation through its predetermined timing cycle. Also, switch 102 is opened and coil 26 is then energized only through switches 112, 114. If nothing further happens in the circuit during the timing cycle, the timer mechanism will operate to open contacts 112, 114 and break the circuit to start coil 26, causing switches 28, 30, 32 to open and the motor to stop.

However, if prior to the end of the timer cycle, the operator strikes an arc on the workpiece, the flow of DC current through the load circuit is detected by coil 141 of DC solenoid relay 140. Energization of coil 141 by DC current results in closure of switch 142 and the completion of an alternate power circuit from winding 82 through switch 142 and timer coil 109, thereby resetting the timer mechanism. Subsequent interruption of the welding arc will again deenergize coil 141 and the timer coil, and thereby start the timer mechanism operating through its cycle. However, it should be apparent that the operator can continue to weld intermittently, with motor 12 and generator 14 operating continuously, so long as the operator strikes arcs at intervals shorter than the interval of the timer cycle which can be adjusted to a suitable interval. Should the operator fail to strike an arc within such an interval, motor 12 will stop but can then be restarted by contacting rod 135 to the workpiece in the manner originally explained.

In the event that the operator wishes to manually start the motor he can do so by pressing manual start button 40. This energizes start coil 26 and relay coil 72 which is in parallel therewith so long as normally closed switch 110 remains closed. It should be apparent that, if relay coil 72 is energized before timer coil 109, coil 72 operates to close switch 74 and energize the timer coil through the alternate power circuit from winding 82. The timer is them reset and the motor will remain on until the timer mechanism times out in the manner previously described.

It should be apparent that the circuit described has several advantages over conventional control circuits. For example, the utilization of a low voltage power switching relay circuit enables motor 12 to be automatically started without striking a welding arc. Thereafter, the provision of a time delay means in the form of timer 108 for controlling the stopping of motor 12 enables an operator to conduct intermittent welding operations without starting and stopping the motor each time he stops welding. Furthermore, even should an operator not desire to continue welding at intervals of sufficient length to maintain motor 12 operating, he can later restart the motor by remote control without returning to the site of the power supply.

I claim:

1. A control circuit for remote starting of an AC motor powered by AC supply lines that is coupled to a DC generator, said generator being connected to a welding load circuit including a workpiece and a rod to supply DC power thereto, comprising,
   a low voltage switching circuit connected across said load circuit which is closed upon contact between said rod and said workpiece, said switching circuit including a first relay coil which is energized with closing of said switching circuit, power circuit switch means responsive to energizing of said first relay coil electrically connected to said motor for closing a power circuit between said AC supply lines and said motor on energizing of said first relay coil thus to start the generator, said welding load circuit including the coil of a DC relay which is energized with starting of the generator and with said rod contacting said workpiece, electrically operated timer means for maintaining said power circuit to said motor closed after opening of contact between said rod and said workpiece, and first switch means actuated by said DC relay coil controlling said timer means and sensing opening of contact between said rod and said workpiece.

2. A control circuit as claimed in claim 1, which further includes second switch means actuated by said first relay coil controlling said timer means.

3. A control circuit as claimed in claim 1, which further includes second switch means actuated by said first relay coil, and wherein said timer means includes a timer coil operating the timer means, and wherein said first and second switch means are both in circuits provided for energizing of said timer coil.

4. A control circuit as claimed in claim 1, wherein said low voltage switching circuit comprises a low voltage AC circuit which includes a winding of a transformer, said transformer being powered by said AC supply lines, and wherein said timer means includes a timer coil operating the timer means, and which further includes a second switch means actuated by said first relay coil, and wherein said first and second switch means both make and break circuits supplying AC current to said timer coil.

5. The control circuit of claim 4, which further includes a third switch means which is actuated to open up the switching circuit with closing of said power circuit.

6. The control circuit of claim 5, which further includes manually operated switch means for operating said power circuit switch means, and a relay which is actuated on actuation of said manually operated switch means controlling said timer means.

7. A control circuit as claimed in claim 1, wherein said switching circuit further includes another switch means which is actuated to open up the switching circuit with closing of said power circuit.

* * * * *